US012644032B2

(12) United States Patent
Allgood et al.

(10) Patent No.: US 12,644,032 B2
(45) Date of Patent: Jun. 2, 2026

(54) SYSTEMS AND PROCESSES OF THERMAL FLUID RECLAMATION

(71) Applicant: THE CHEMOURS COMPANY FC, LLC, Wilmington, DE (US)

(72) Inventors: Charles Clinton Allgood, Elkton, MD (US); Sheng Peng, Hockessin, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 18/625,486

(22) Filed: Apr. 3, 2024

(65) Prior Publication Data

US 2024/0336822 A1 Oct. 10, 2024

Related U.S. Application Data

(60) Provisional application No. 63/457,606, filed on Apr. 6, 2023.

(51) Int. Cl.
*C09K 5/04* (2006.01)

(52) U.S. Cl.
CPC ........ *C09K 5/045* (2013.01); *C09K 2205/122* (2013.01); *C09K 2205/126* (2013.01); *C09K 2205/22* (2013.01)

(58) Field of Classification Search
CPC .................................................... C09K 5/045
See application file for complete search history.

(56) References Cited

U.S. PATENT DOCUMENTS

| | | |
|---|---|---|
| 6,018,952 A | 2/2000 | Ide et al. |
| 7,250,539 B2 | 7/2007 | Iikubo et al. |
| 8,002,457 B2 | 8/2011 | Cottrell et al. |
| 8,572,992 B2 | 11/2013 | Murray et al. |
| 11,162,720 B2 | 11/2021 | Crombie et al. |
| 11,286,409 B2 | 3/2022 | Itano et al. |
| 2018/0127628 A1 | 5/2018 | Nappa et al. |
| 2021/0122962 A1 | 4/2021 | Allgood et al. |
| 2022/0049882 A1 | 2/2022 | Crombie et al. |

OTHER PUBLICATIONS

Designation and Safety Classification of Refrigerants, ASHRAE Standard 34-2004) Includes ANSI/ASHRAE Addenda listed in Appendix F, 2007, American Society of Heating, Refrigerating and Air-Conditioning Engineers, Inc., Atlanta, Georgia.
Specifications for Refrigerants, AHRI Standard 700-2017 with addendum 1, Sep. 2017, Air Conditioning, Heating & Refrigeration Institute (AHRI), Arlington, Virginia.

*Primary Examiner* — Peter F Godenschwager

(57) ABSTRACT

A process of thermal fluid reclamation includes combining at least two recovered thermal fluids including at least two refrigerant compounds to form a consolidated thermal fluid. The consolidated thermal fluid is a blend of the at least two refrigerant compounds having a consolidated composition different from a recovered composition of at least one of the least two recovered thermal fluids. The process also includes testing the consolidated thermal fluid and validating that the consolidated thermal fluid has greater than 95 wt % organic purity. The process further includes adding at least one virgin thermal fluid or used thermal fluid to the consolidated thermal fluid to form a reconstituted thermal fluid. The process yet further includes analyzing and purifying the reconstituted thermal fluid to form a reclaimed thermal fluid. The reclaimed thermal fluid has a predetermined reclaimed thermal fluid composition different from a consolidated thermal fluid composition of the consolidated thermal fluid.

18 Claims, 4 Drawing Sheets

SYSTEMS AND PROCESSES OF THERMAL FLUID RECLAMATION

CROSS REFERENCE TO RELATED APPLICATIONS

This application claims priority to U.S. Provisional Application No. 63/457,606, filed on Apr. 6, 2023, the disclosure of which is herein incorporated by reference in its entirety.

TECHNICAL FIELD OF THE INVENTION

The present disclosure relates to systems and processes of thermal fluid reclamation. More specifically, the present disclosure relates to systems and processes of converting spent thermal fluids into reclaimed multi-compound thermal fluids.

BACKGROUND OF THE INVENTION

Thermal fluid or refrigerant reclamation has long attracted significant attention due to regulatory requirements and increasing emphasis on circularity, emissions reduction, and resource efficiency. Thermal fluids typically contain at least one halogenated compound which has the potential to negatively affect the environment. An efficient and effective reclamation process benefits both the environment and the global economy. Historically, refrigerant reclamation has been limited essentially to single-compound fluids, such as chlorodifluoromethane (CHClF$_2$; HCFC-22) or 1,1,2-tetrafluoroethane (CF$_3$—CH$_2$F; HFC-134a), or azeotropic fluids, such as R-507 (50 wt % pentafluoroethane (C$_2$HF$_5$, R-125) and 50 wt % 1,1,1-trifluoroethane (CF$_3$CH$_3$, R-143a)).

Efficient and effective reclamation of multi-component (including azeotropic, near azeotropic, and non-azeotropic) thermal fluids would further benefit both the environment and the global economy.

SUMMARY OF THE INVENTION

In an example embodiment, a process of thermal fluid reclamation includes combining at least two recovered thermal fluids including at least two refrigerant compounds to form a consolidated thermal fluid. The consolidated thermal fluid is a blend of the at least two refrigerant compounds having a consolidated composition different from a recovered composition of at least one of the least two recovered thermal fluids. The process also includes testing the consolidated thermal fluid and validating that the consolidated thermal fluid has greater than 99.5 wt % organic purity. The process further includes adding at least one virgin thermal fluid or used thermal fluid to the consolidated thermal fluid to form a reconstituted thermal fluid. The process yet further includes analyzing and purifying the reconstituted thermal fluid to form a reclaimed thermal fluid. The reclaimed thermal fluid has a predetermined reclaimed thermal fluid composition different from a consolidated thermal fluid composition of the consolidated thermal fluid.

Other features and advantages of the present invention will be apparent from the following more detailed description, taken in conjunction with the accompanying drawings which illustrate, by way of example, the principles of this disclosure.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
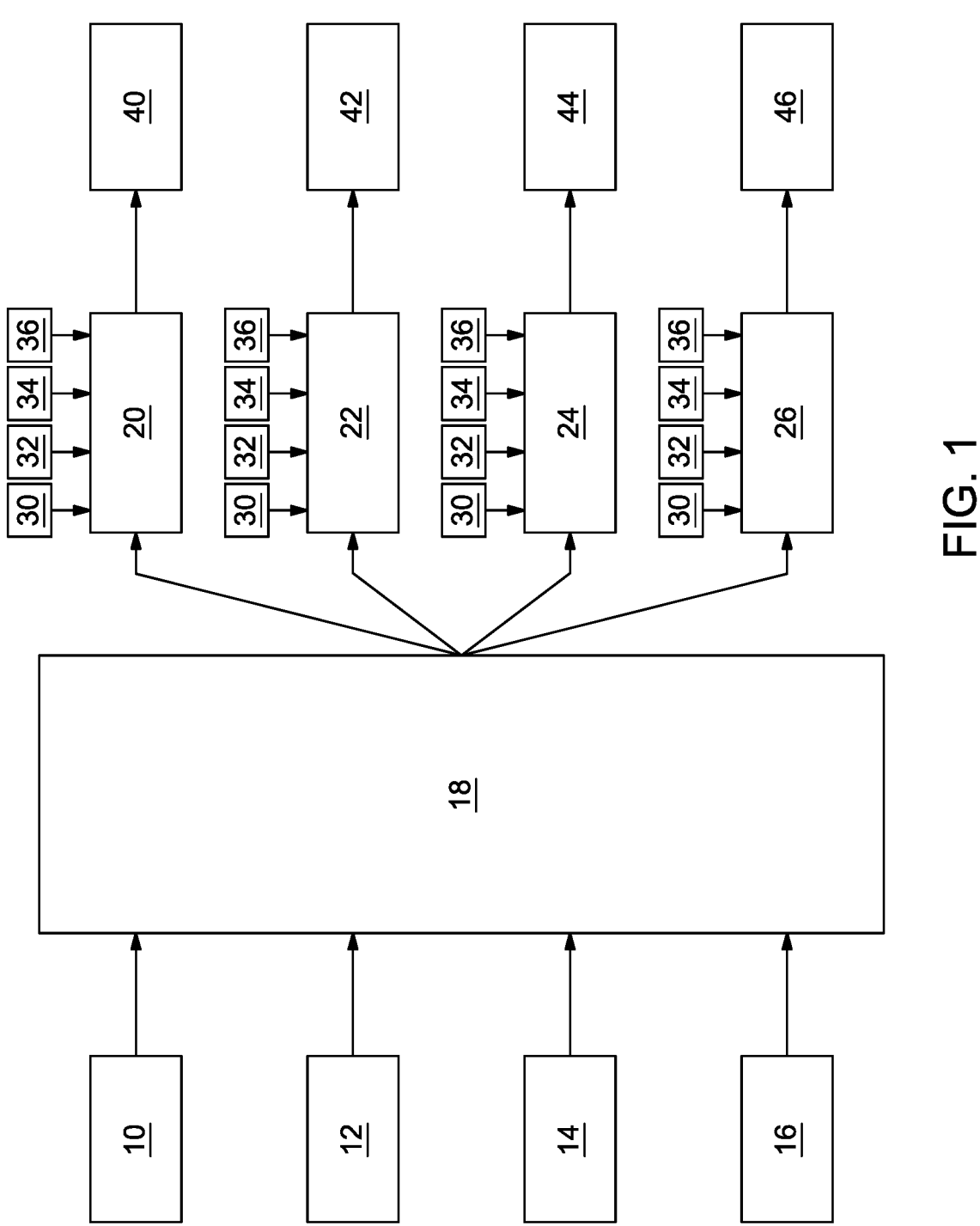
FIG. 1 schematically shows a system of reclaiming four different thermal fluid compositions from four different recovered thermal fluids in an embodiment of the present disclosure.

In exemplary embodiments, an integrated business and engineering process effectively and efficiently recovers multiple used single component thermal fluids and/or multicomponent thermal fluid blends and modifies the recovered product streams to manufacture new product streams that reduces both manufacture of virgin thermal fluids and the need for destruction of out-of-specification (unreclaimable) spent thermal fluids.

As used herein, "refrigerant compound" refers to any hydrofluorocarbon (HFC), hydrochlorofluorocarbon (HCFC), chlorofluorocarbon (CFC), hydrochlorofluoroolefin (HCFO), Hydrochloroolefin (HCO), Chlorofluoroolefin (CFO) or hydrofluoroolefin (HFO) that may be used alone or in a blend with other refrigerant compounds as a thermal fluid.

As used herein, "thermal fluid" refers to any fluid used for heat transfer in a closed-loop system.

As used herein, "virgin thermal fluid" refers to a thermal fluid composition having at least 99.5 wt % organic purity, or at least 99.6 wt % organic purity, or at least 99.7 wt % organic purity, or at least 99.8 wt % organic purity, or at least 99.9 wt % organic purity, and that has not yet been used in a thermal fluid application.

As used herein, "used thermal fluid" refers to a thermal fluid composition having at least 95 wt %, or at least 96 wt %, or at least 97 wt %, or preferably at least 98 wt %, or at least 99 wt %, or preferably at least 99.5 wt % organic purity that has been used as a thermal fluid.

As used herein, "spent thermal fluid" refers to a thermal fluid composition having less than 99.5 wt %, or less than 99 wt %, or preferably less than 98 wt %, or less than 97 wt %, or less than 96 wt %, or preferably less than 95 wt % organic purity that has been used as a thermal fluid.

As used herein, "recovered thermal fluid" refers to a spent thermal fluid or a used thermal fluid drained or otherwise removed from a thermal management device, apparatus or system, such as, for example, a refrigerator or an air-conditioner.

As used herein, "consolidated thermal fluid composition" refers to a blend formed by combining two or more different recovered thermal fluid types.

As used herein, "reconstituted thermal fluid" refers to a thermal fluid formed by adding one or more thermal fluids, such as, for example, virgin, used, or reclaimed thermal fluids, to a consolidated thermal fluid to adjust the relative amounts of refrigerant components in the consolidated thermal fluid to a conventional thermal fluid blend.

As used herein, "reclaimed thermal fluid" refers to a reconstituted thermal fluid having at least 99.5 wt % organic purity and meeting conventional specifications for commercial use or sale as a thermal fluid.

As used herein, "organic purity" refers to the degree to which a fluid or fluid composition is free of contaminants such as oil and inorganic materials, such as water, acid, non-absorbable gases (NAGs), particulates/solids, and the like.

In exemplary embodiments, systems and processes of thermal fluid reclamation combine at least two recovered thermal fluids including at least two refrigerant compounds to form a consolidated thermal fluid. The consolidated thermal fluid is a blend of the at least two refrigerant compounds having a consolidated composition different from a recovered composition of at least one of the least two recovered thermal fluids. The system and process test the consolidated thermal fluid and validate that the consolidated thermal fluid has greater than 99.5 wt % organic purity. The systems and processes add at least one virgin thermal fluid or used thermal fluid to the consolidated thermal fluid to form a reconstituted thermal fluid. The systems and processes further include analyzing and purifying the reconstituted thermal fluid to form a reclaimed thermal fluid. The reclaimed thermal fluid has a predetermined reclaimed thermal fluid composition different from a consolidated thermal fluid composition of the consolidated thermal fluid.

FIG. 1 shows a system for reclaiming four different thermal fluid compositions from four different recovered thermal fluids. Four different types of recovered thermal fluid blends are maintained in recovery tanks 10, 12, 14, 16 and fed as needed to a consolidation tank 18, where they may be combined and mixed together to form a consolidated thermal fluid. The recovered thermal fluid blends have different percentages of the same refrigerant compounds. The recovered thermal blends may be individually tested and validated for organic purity and/or the consolidated thermal fluid may be tested and validated for organic purity. Testing may include determining the composition and the amount of organic purity. Validating may include removing one or more impurities and confirming that the thermal fluid has an organic purity greater than 99.5 wt %.

The tested and validated consolidated thermal fluid is then fed as needed to four reconstitution tanks 20, 22, 24, 26, one for each desired reclaimed thermal fluid composition. The composition may be adjusted in each reconstitution tank 20, 22, 24, 26 by feeding one or more thermal fluids from one or more adjustment tanks 30, 32, 34, 36 into each reconstitution tank 20, 22, 24, 26 to form four different reconstituted thermal fluids. The thermal fluids in the adjustment tanks 30, 32, 34, 36 may be virgin, used, or reclaimed thermal fluids. Each adjustment tank 30, 32, 34, 36 may hold a single refrigerant compound or a blend of two or more refrigerant compounds.

The reconstituted thermal fluids may each individually be subjected to a final purification and analysis to confirm that they are commercial-grade prior to being fed as needed to respective reclaimed thermal fluid containers 40, 42, 44, 46 for use or commercial sale. The final purification and analysis may include analyzing and purifying as needed for water content, nonabsorbable gas (NAG) content, content of other impurities, and/or organic purity.

The system may operate on a continuous, batch, or semi-batch basis. In exemplary embodiments, the flow of the various streams is selected to reduce or minimize the amounts of thermal fluids from the adjustment tanks 30, 32, 34, 36 in the reclaimed thermal fluids relative to the amounts of consolidated thermal fluid.

Figure 2:
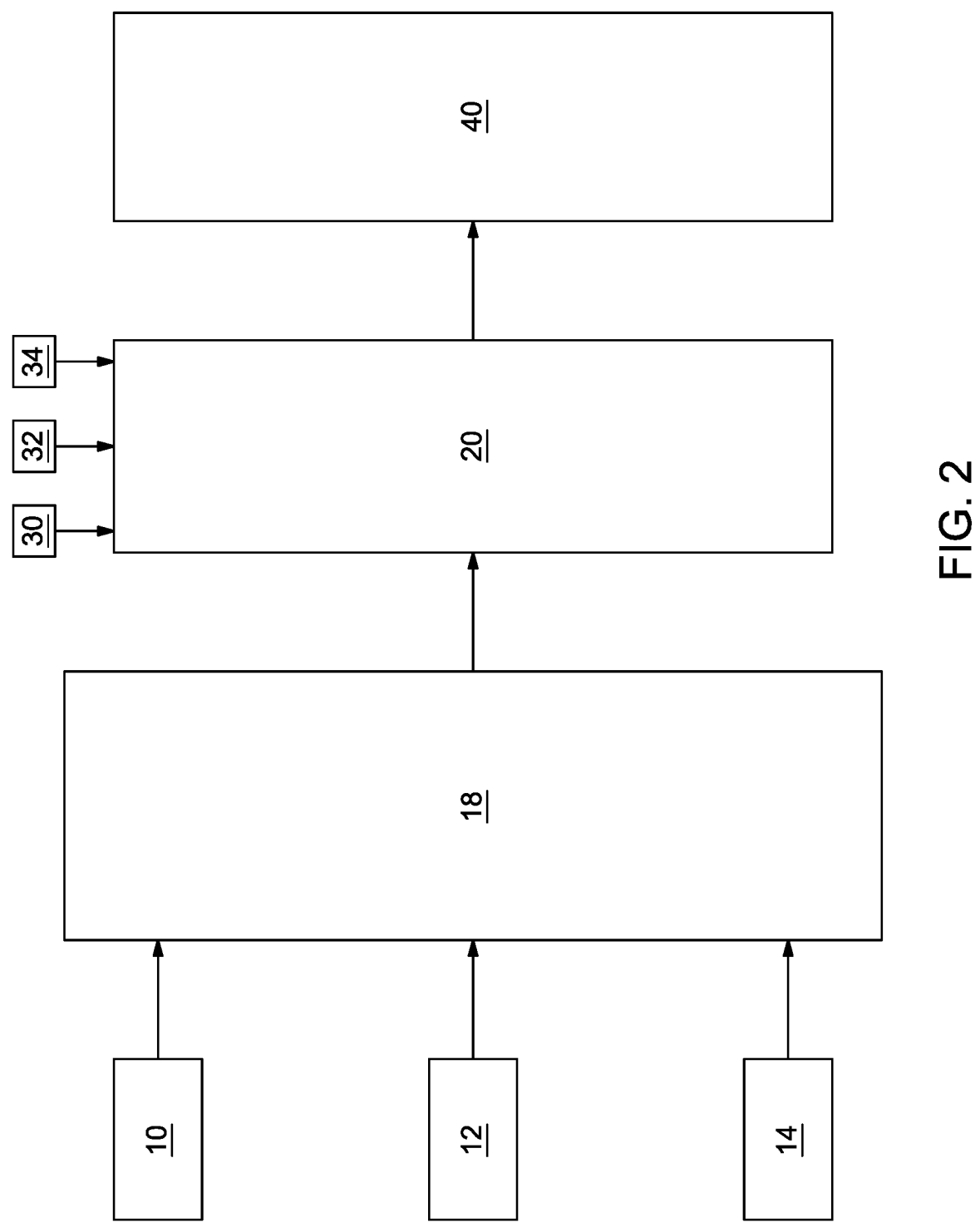
FIG. 2 schematically shows a system of reclaiming a thermal fluid from three different recovered thermal fluids in an embodiment of the present disclosure.

FIG. 2 shows a system of reclaiming a thermal fluid from three different recovered thermal fluids. Three different types of recovered thermal fluids are maintained in recovery tanks 10, 12, 14 and fed as needed to a consolidation tank 18, where they may be combined and mixed together to form a consolidated thermal fluid. The first recovered thermal fluid includes a single refrigerant compound. The second recovered thermal fluid is a blend of two refrigerant compounds, one of which is the same as in the first recovered thermal fluid. The third recovered thermal fluid is a blend of three refrigerant compounds, two of which are the same as in the second recovered thermal fluid. The recovered thermal fluids may be individually tested and validated for organic purity and/or the consolidated thermal fluid may be tested and validated for organic purity. Testing may include determining the composition and the amount of organic purity. Validating may include removing one or more impurities and confirming that the thermal fluid has an organic purity greater than 99.5 wt %.

The tested and validated consolidated thermal fluid is then fed as needed to a reconstitution tank 20. The composition may be adjusted in the reconstitution tank 20 by feeding one or more thermal fluids from one or more adjustment tanks 30, 32, 34 into the reconstitution tank 20 to form a reconstituted thermal fluid. The reconstituted thermal fluid may be of the same type as the third recovered thermal fluid or different. The thermal fluids in the adjustment tanks 30, 32, 34 may be virgin, used, or reclaimed thermal fluids. Each adjustment tank 30, 32, 34 may hold a single refrigerant compound or a blend of two or more refrigerant compounds.

The reconstituted thermal fluid may be subjected to a final purification and analysis to confirm that it is commercial-grade prior to being fed as needed to a reclaimed thermal fluid container 40 for use or commercial sale. The final purification and analysis may include analyzing and purifying as needed for water content, nonabsorbable gas (NAG) content, content of other impurities, and/or organic purity.

The system may operate on a continuous, batch, or semi-batch basis. In exemplary embodiments, the flow of the various streams is selected to reduce or minimize the amounts of thermal fluids from the adjustment tanks 30, 32, 34 in the reclaimed thermal fluid relative to the amount of consolidated thermal fluid.

Figure 3:
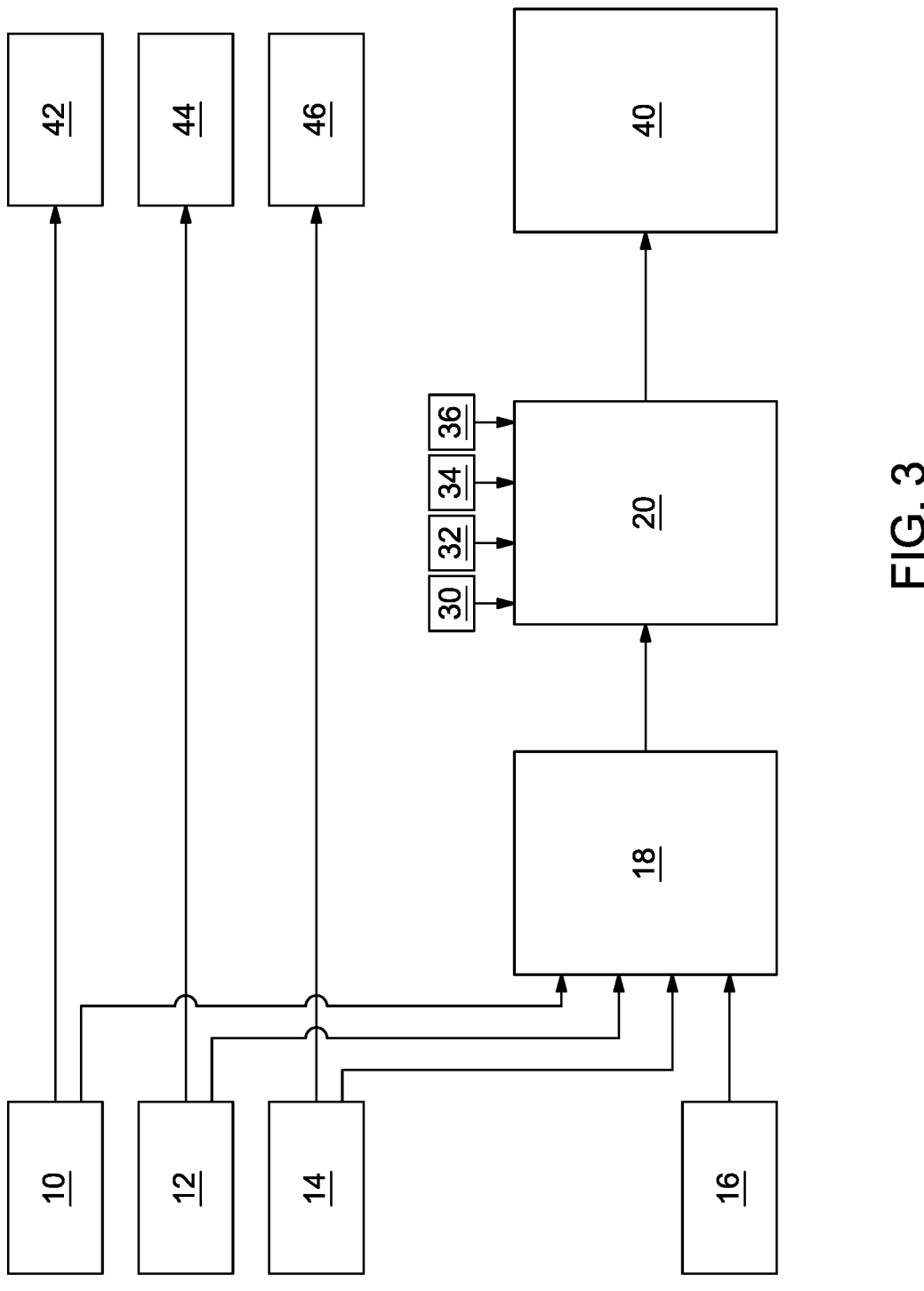
FIG. 3 schematically shows a system of reclaiming four different thermal fluid compositions from four different recovered thermal fluids in an embodiment of the present disclosure.

FIG. 3 shows a system of reclaiming four different thermal fluid compositions from four different recovered thermal fluids. Four different types of recovered thermal fluids are maintained in recovery tanks 10, 12, 14, 16 and fed as needed to a consolidation tank 18, where they may be combined and mixed together to form a consolidated thermal fluid. The first recovered thermal fluid includes a single refrigerant compound. The second recovered thermal fluid is a blend of two refrigerant compounds, one of which is the same as in the first recovered thermal fluid. The third recovered thermal fluid is a blend of three refrigerant compounds, two of which are the same as in the second recovered thermal fluid. The fourth recovered thermal fluid is a blend of four refrigerant compounds, three of which are the same as in the third recovered thermal fluid. The recovered thermal fluids may be individually tested and validated for organic purity and/or the consolidated thermal fluid may be tested and validated for organic purity. Testing may include determining the composition and the amount of organic purity. Validating may include removing one or more impurities and confirming that the thermal fluid has an organic purity greater than 99.5 wt %.

The tested and validated consolidated thermal fluid is then fed as needed to a reconstitution tank 20. The composition may be adjusted in the reconstitution tank 20 by feeding one or more thermal fluids from one or more adjustment tanks 30, 32, 34, 36 into the reconstitution tank 20 to form a reconstituted thermal fluid. The thermal fluids in the adjustment tanks 30, 32, 34, 36 may be virgin, used, or reclaimed thermal fluids. Each adjustment tank 30, 32, 34, 36 may hold a single refrigerant compound or a blend of two or more refrigerant compounds.

The reconstituted thermal fluid may be subjected to a final purification and analysis to confirm that it is commercial-grade prior to being fed as needed to a reclaimed thermal fluid container 40 for use or commercial sale. The final purification and analysis may include analyzing and purifying as needed for water content, nonabsorbable gas (NAG) content, content of other impurities, and/or organic purity.

Portions of the first, second, and third recovered thermal fluids may be reclaimed directly to respective reclaimed thermal fluids by individually testing and validating for organic purity and subjecting to a final purification and analysis to confirm that they are commercial-grade prior to being fed as needed to respective reclaimed thermal fluid containers 42, 44, 46 for use or commercial sale.

The system may operate on a continuous, batch, or semi-batch basis. In exemplary embodiments, the flow of the various streams is selected to reduce or minimize the amounts of thermal fluids from the adjustment tanks 30, 32, 34, 36 in the reclaimed thermal fluids relative to the amounts of consolidated thermal fluid.

Figure 4:
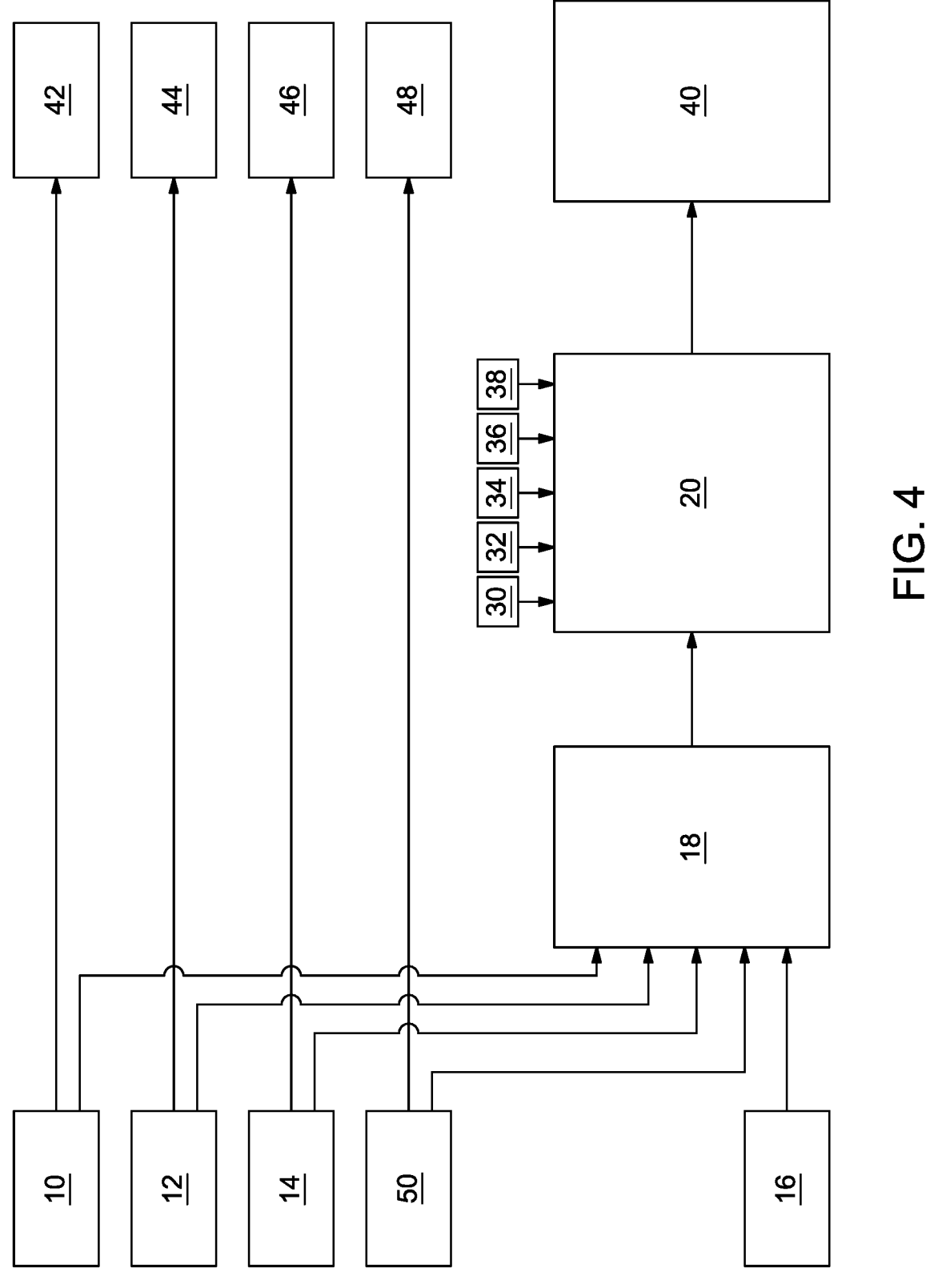
FIG. 4 schematically shows a system of reclaiming five different thermal fluid compositions from five different recovered thermal fluids in an embodiment of the present disclosure.

FIG. 4 shows a system of reclaiming five different thermal fluid compositions from five different recovered thermal fluids. Five different types of recovered thermal fluids are maintained in recovery tanks 10, 12, 14, 50, 16 and fed as needed to a consolidation tank 18, where they may be combined and mixed together to form a consolidated thermal fluid. The first recovered thermal fluid includes a single refrigerant compound. The second recovered thermal fluid is a blend of two refrigerant compounds, one of which is the same as in the first recovered thermal fluid. The third recovered thermal fluid is a blend of three refrigerant compounds, two of which are the same as in the second recovered thermal fluid. The fourth recovered thermal fluid is a blend of four refrigerant compounds, three of which are the same as in the third recovered thermal fluid. The fifth recovered thermal fluid is a blend of five refrigerant compounds, four of which are the same as in the fourth recovered thermal fluid. The recovered thermal fluids may be individually tested and validated for organic purity and/or the consolidated thermal fluid may be tested and validated for organic purity. Testing may include determining the composition and the amount of organic purity. Validating may include removing one or more impurities and confirming that the thermal fluid has an organic purity greater than 99.5 wt %.

The tested and validated consolidated thermal fluid is then fed as needed to a reconstitution tank 20. The composition may be adjusted in the reconstitution tank 20 by feeding one or more thermal fluids from one or more adjustment tanks 30, 32, 34, 36, 38 into the reconstitution tank 20 to form a reconstituted thermal fluid. The thermal fluids in the adjustment tanks 30, 32, 34, 36, 38 may be virgin, used, or reclaimed thermal fluids. Each adjustment tank 30, 32, 34, 36, 38 may hold a single refrigerant compound or a blend of two or more refrigerant compounds.

The reconstituted thermal fluid may be subjected to a final purification and analysis to confirm that it is commercial-grade prior to being fed as needed to a reclaimed thermal fluid container 40 for use or commercial sale. The final purification and analysis may include analyzing and purifying as needed for water content, nonabsorbable gas (NAG) content, content of other impurities, and/or organic purity.

Portions of the first, second, third, and fourth recovered thermal fluids may be reclaimed directly to respective reclaimed thermal fluids by individually testing and validating for organic purity and subjecting to a final purification and analysis to confirm that they are commercial-grade prior to being fed as needed to respective reclaimed thermal fluid containers 42, 44, 46, 48 for use or commercial sale.

The system may operate on a continuous, batch, or semi-batch basis. In exemplary embodiments, the flow of the various streams is selected to reduce or minimize the amounts of thermal fluids from the adjustment tanks 30, 32, 34, 36, 38 in the reclaimed thermal fluids relative to the amounts of consolidated thermal fluid.

It will be understood by those skilled in the art that while the above embodiments are described with respect to a certain number of thermal fluids and tanks, the processes of these embodiments are not so limited and are equally applicable to a lesser or greater number of thermal fluids and tanks.

Other systems may be designed and constructed to include other numbers and combinations of different recovered thermal fluids and produce other numbers of different reclaimed thermal fluids. The types of reclaimed thermal fluids may be the same or different from the types of recovered fluids.

In some embodiments, a consolidation tank receives at least a portion of each of the types of recovered thermal fluids, such that the consolidation tank includes some of all of the refrigerant compounds present in the system. Some systems may have more than one consolidation tank, where additional consolidation tanks receive more than one but not all of the types of recovered thermal fluids and contain more than one but not necessarily all of the refrigerant compounds present in the system. In exemplary embodiments, each consolidation tank includes at least two refrigerant compounds. The types of recovered thermal fluids directed to a consolidation tank may be selected based on the refrigerant compounds that they include and the refrigerant compounds in the reclaimed thermal fluid to be formed from the consolidated thermal fluid.

In exemplary embodiments, when the reclaimed thermal fluid includes at least one HFO refrigerant compound, the reclamation process includes adding a stabilizer package to the reconstituted thermal fluid. In exemplary embodiments, the stabilizer package includes an effective amount of at least one inhibitor such that the thermal fluid remains substantially free of oligomeric, homopolymeric, or other polymeric products derived from the thermal fluid. In some embodiments, the at least one inhibitor is selected from hydrocarbons comprising at least one of cyclic monoterpene; lipophilic organic compounds including tocopherols such as $\alpha$-tocopherol; or phenols, aromatic organic compounds having at least one chemical moiety-$C_6H_4$ (OH), including benzene-1,4-diol. Specific examples of inhibitor compounds comprise at least one member selected from the group consisting of limonene, $\alpha$-terpinene, $\alpha$-tocopherol, butylated hydroxytoluene (BHT), 4-methoxyphenol, and benzene-1,4-diol. In one embodiment, the inhibitor composition comprises a liquid at a temperature from about −80° C. to about 180° C., about −70° C. to about 170° C., and in some cases about −60° C. to about 160° C. By "stabilized" it is meant to refer to a composition comprising an effective amount of at least one inhibitor compound that inhibits, if not eliminates, a fluoroethylene from interacting with another compound and forming dimers, oligomers, homopolymers, or polymeric products.

In some embodiments, an analyzer determines the composition and purity of one or more of the thermal fluids of the system and process. In some embodiments, the analyzer determines the type of recovered thermal fluid and purity as it is being recovered from a thermal management device. The analyzer may alternatively determine the type and purity of the consolidated thermal fluid, the reconstituted thermal fluid, and/or the reclaimed thermal fluid. If the analyzed thermal fluid is determined to be organically pure (>99.5 wt %) and of a single type by the analyzer, the thermal fluid may be transferred to an appropriate recovery tank. If, however, there are impurities (or the organic purity is less than 99.5 wt %), such as, oil, water, dirt, and/or acid, found in the analyzed thermal fluid by the analyzer, the analyzed thermal fluid may be sent to a regenerator for reprocessing.

In some embodiments, a regenerator purifies the recovered thermal fluid, the consolidated thermal fluid, the reconstituted thermal fluid, and/or the reclaimed thermal fluid to a state that meets HARI Standard 700 purity specifications. The regenerator can include at least a compressor, a separator, a filter dryer, and may further include a distiller, a diluter, or a reformulator. In some embodiments, the compressor is driven to circulate the thermal fluid in a refrigerant circuit such that a voltage is applied to reduce or remove oil, such as the refrigerating machine oil, in the thermal fluid. In some embodiments, the separator is a type of oil separator. In some embodiments, the filter dryer reduces or removes water and acid included in the thermal fluid. The regenerator can also determine information on the appropriateness of the oil, water, and acid included in the thermal fluid after the regeneration processing and compile the thermal fluid composition, the weight, and the like.

In some embodiments, a purification process purifies the recovered thermal fluid, the consolidated thermal fluid, the reconstituted thermal fluid, and/or the reclaimed thermal fluid to a state that meets AHRI Standard 700 purity specifications. The purification process comprises at least one of the steps: decanting for gross amount of water removal by decanter, distillation via distillation column(s), adsorption via adsorbent bed(s), drying via adsorbent beds or column(s), NAG adjustment via non-condensable purge unit(s), neutralization via a neutralizer, etc.

In exemplary embodiments, the reclaimed thermal fluid is selected from, and meets the standards of, Standard for Specifications for Refrigerants, Air-Conditioning, Heating & Refrigeration Institute (AHRI 700), which is incorporated by reference in its entirety herein. AHRI 700 specifies acceptable levels of contaminants (purity requirements) for fluorocarbon, hydrocarbon, and carbon dioxide refrigerants regardless of source and lists acceptable test methods. These refrigerants are as referenced in the ANSI/ASHRAE Standard 34 with Addenda, which is also incorporated by reference in its entirety herein.

Appropriate fluorocarbon refrigerant compounds for systems and methods of the present disclosure may include, but are not limited to, R-11; R-12; R-13; R-22; R-23; R-32; CF3I; R-113; R-114; R-115; R-116; R-123; R-124; R-125; R-134a; R-141b; R-142b; R-143a; R-152a; R-218; R-227ea; R-236fa; R-245fa; R-1233zd (E); R-1233zd (Z); R-1234yf;

R-1234ze (E); R-1234ze (Z); R-1224 yd (E); R-1224 yd (Z); R-1132 (E); R-1132 (Z); R-1132a; R-1336mzz (E) and R-1336mzz (Z).

Appropriate hydrocarbon refrigerant compounds for systems and methods of the present disclosure may include, but are not limited to, R-50; R-170; R-E170; R-290; R-600; R-600a; R-601; R-601a; R-610; R-1150; and R-1270.

Appropriate carbon dioxide refrigerant compounds for systems and methods of the present disclosure may include, but is not limited to, R-744.

Appropriate zeotropic blend thermal fluids for systems and methods of the present disclosure may include, but are not limited to, R-401A; R-401B; R-402A; R-402B; R-403A; R-403B; R-404A; R-405A; R-406A; R-407A; R-407B; R-407C; R-407D; R-407E; R-407F; R-407G; R407H; R-408A; R-409A; R-409B; R-410A; R-410B; R-411A; R-411B; R-412A; R-413A; R-414A; R-414B; R-415A; R-415B; R-416A; R-417A; R-417B; R-417C; R-418A; R-419A; R-419B; R-420A; R-421A; R-421B; R-422A; R-422B; R-422C; R-422D; R-422E; R-423A; R-424A; R-425A; R-426A; R-427A; R-428A; R-429A; R-430A; R-431A; R-434A; R-435A; R-437A; R-438A; R-439A; R-440A; R-442A; R-444A; R-444B; R-445A; R-446A; R-447A; R-447B; R-448A; R-449A; R-449B; R-449C; R-450A; R-451A; R-451B; R-452A; R-452B; R-452C; R-453A; R-454A; R-454B; R-454C; R-455A; R-456A; R-457A; R-457B; R-457C; R-458A; R-459A; R-459B; R-460A; R-460B; R-461A; R-462A; R-463A; R-464A; R-465A; R-466A; R-467A; R-468A; R-468B; R-468A; R-469A; R-470A; R-470B; 471A; 472A; 472B; 473A; 474A; 475A; 476A; and 479A.

Appropriate zeotropic hydrocarbon blend thermal fluids for systems and methods of the present disclosure may include, but are not limited to, R-432A; R-433A; R-433B; R-433C; R-436A; R-436B; R-441A; and R-443A.

Appropriate azeotropic blend thermal fluids for systems and methods of the present disclosure may include, but are not limited to, R-500; R-502; R-503; R-507A; R-508A; R-508B; R-509A; R-510A; R-511A; R-512A; R-513A; R-513B; R-514A; R-515A; R-515B; and R-516A.

EXAMPLES

The invention will be described in greater detail by way of specific examples. The following examples are offered for illustrative purposes and are not intended to limit the invention in any manner. Those of skill in the art will readily recognize a variety of non-critical parameters which can be changed or modified to yield essentially the same results.

Example 1

Two or more different used or spent thermal fluids from Table 1 are recovered, tested, and validated and then combined to form a consolidated thermal fluid composition. The consolidated thermal fluid composition includes difluoromethane ($CH_2F_2$, R-32), pentafluoroethane ($C_2HF_5$, R-125), and/or 1,1,1,2-tetrafluoroethane ($CF_3CH_2F$, R-134a). If the impurities are greater than 0.5%, the composition may be purified to reduce the level of impurities to less than 0.5%.

The composition of all or any portion of the consolidated thermal fluid composition is then adjusted by addition of one or more virgin or used thermal fluids to adjust to the composition to form a reconstituted thermal fluid of one of the R-407 series of thermal fluids listed in Table 1.

TABLE 1

| R-407 RECLAMATION COMPONENTS | | | |
| --- | --- | --- | --- |
| Thermal Fluid | R-32 (wt %) | R-125 (wt %) | R-134a (wt %) |
| R-32 | 100 | | |
| R-125 | | 100 | |
| R-134a | | | 100 |
| R-407A | 20 ± 2.0 | 40 ± 2.0 | 40 ± 2.0 |
| R-407B | 10 ± 2.0 | 70 ± 2.0 | 20 ± 2.0 |
| R-407C | 23 ± 2.0 | 25 ± 2.0 | 52 ± 2.0 |
| R-407D | 15 ± 2.0 | 15 ± 2.0 | 70 ± 2.0 |
| R-407E | 25 ± 2.0 | 15 ± 2.0 | 60 ± 2.0 |
| R-407F | 30 ± 2.0 | 30 ± 2.0 | 40 ± 2.0 |
| R-407H | 32.5 ± 1.0 | 15.0 ± 1.0 | 52.5 ± 2.0 |

The reconstituted thermal fluid may then be further analyzed and purified to form a reclaimed thermal fluid.

Example 2

Two or more different used or spent thermal fluids from Table 2 are recovered, tested, and validated and then combined to form a consolidated thermal fluid composition. The consolidated thermal fluid composition includes R-125, 1,1,1-trifluoroethane ($CF_3CH_3$, R-143a), and/or R-134a. If the impurities are greater than 0.5%, the composition may be purified to reduce the level of impurities to less than 0.5%.

The composition of all or any portion of the consolidated thermal fluid composition is then adjusted by addition of one or more virgin or used thermal fluids to adjust to the composition to form a reconstituted thermal fluid of R-507 or R-404A.

TABLE 2

| R-404 RECLAMATION COMPONENTS | | | |
| --- | --- | --- | --- |
| Thermal Fluid | R-125 (wt %) | R-143a (wt %) | R-134a (wt %) |
| R-125 | 100 | | |
| R-143a | | 100 | |
| R-134a | | | 100 |
| R-507A | 50 | 50 | |
| R-404A | 44 ± 2.0 | 52 ± 2.0 | 4 ± 2.0 |

The reconstituted thermal fluid may then be further analyzed and purified to form a reclaimed thermal fluid.

Example 3

Two or more different used or spent thermal fluids from Table 3 are recovered, tested, and validated. All or a portion of the used or spent thermal fluids are combined to form a consolidated thermal fluid composition. The consolidated thermal fluid composition includes R-32, R-125, R-134a, and/or 2,3,3,3-tetrafluoropropene ($CF_3CF=CH_2$, R-1234yf). If the impurities are greater than 0.5 wt %, the composition may be purified to reduce the level of impurities to less than 0.5 wt %.

The composition of all or any portion of the consolidated thermal fluid composition is then adjusted by addition of one or more virgin or used thermal fluids to adjust to the composition to form a reconstituted thermal fluid of R-410A, the R-407 series, or R-449.

TABLE 3

| R-449 RECLAMATION COMPONENTS | | | | |
| --- | --- | --- | --- | --- |
| Thermal Fluid | R-32 (wt %) | R-125 (wt %) | R-134a (wt %) | R-1234yf (wt %) |
| R-32 | 100 | | | |
| R-125 | | 100 | | |
| R-134a | | | 100 | |
| R-1234yf | | | | 100 |
| R-410A | 49.5 ± 2.0 | 50.5 ± 2.0 | | |
| R-407A | 20 ± 2.0 | 40 ± 2.0 | 40 ± 2.0 | |
| R-407B | 10 ± 2.0 | 70 ± 2.0 | 20 ± 2.0 | |
| R-407C | 23 ± 2.0 | 25 ± 2.0 | 52 ± 2.0 | |
| R-407D | 15 ± 2.0 | 15 ± 2.0 | 70 ± 2.0 | |
| R-407E | 25 ± 2.0 | 15 ± 2.0 | 60 ± 2.0 | |
| R-407F | 30 ± 2.0 | 30 ± 2.0 | 40 ± 2.0 | |
| R-407H | 32.5 ± 1.0 | 15.0 ± 1.0 | 52.5 ± 2.0 | |
| R-449A | 24.3 + 0.2, −1.0 | 24.7 + 1.0, −0.2 | 25.7 + 1.0, −0.2 | 25.3 + 0.2, −1.0 |

The reconstituted thermal fluid may then be further analyzed and purified to form a reclaimed thermal fluid.

All or any portion of any of the recovered fluids may alternatively be further analyzed and purified to form a reclaimed thermal fluid of their original thermal fluid composition rather than being combined to form the consolidated thermal fluid composition.

For blends containing an HFO, a stabilizer package may be added to the reconstituted thermal fluid or the reclaimed thermal fluid to stabilize the HFO in the thermal fluid.

Example 4

Two or more different used or spent thermal fluids from Table 4 are recovered, tested, and validated. All or a portion of the used or spent thermal fluids are combined to form a consolidated thermal fluid composition. The consolidated thermal fluid composition includes R-32, R-125, R-134a, R-1234yf, and/or 1,3,3,3-tetrafluoropropene ($CF_3CH=CHF$, R-1234ze (E)). If the impurities are greater than 0.5%, the composition may be purified to reduce the level of impurities to less than 0.5%.

The composition of all or any portion of the consolidated thermal fluid composition is then adjusted by addition of one or more virgin or used thermal fluids to adjust to the composition to form a reconstituted thermal fluid of R-410A, the R-407 series, R-449, or R-448.

TABLE 4

| | R-448 RECLAMATION COMPONENTS | | | | |
|---|---|---|---|---|---|
| Thermal Fluid | R-32 (wt %) | R-125 (wt %) | R-134a (wt %) | R-1234yf (wt %) | R-1234ze (wt %) |
| R-32 | 100 | | | | |
| R-125 | | 100 | | | |
| R-134a | | | 100 | | |
| R-1234yf | | | | 100 | |
| R-1234ze(E) | | | | | 100 |
| R-410A | 49.5 ± 2.0 | 50.5 ± 2.0 | | | |
| R-407A | 20 ± 2.0 | 40 ± 2.0 | 40 ± 2.0 | | |
| R-407B | 10 ± 2.0 | 70 ± 2.0 | 20 ± 2.0 | | |
| R-407C | 23 ± 2.0 | 25 ± 2.0 | 52 ± 2.0 | | |
| R-407D | 15 ± 2.0 | 15 ± 2.0 | 70 ± 2.0 | | |
| R-407E | 25 ± 2.0 | 15 ± 2.0 | 60 ± 2.0 | | |
| R-407F | 30 ± 2.0 | 30 ± 2.0 | 40 ± 2.0 | | |
| R-407H | 32.5 ± 1.0 | 15.0 ± 1.0 | 52.5 ± 2.0 | | |
| R-449A | 24.3 + 0.2, −1.0 | 24.7 + 1.0, −0.2 | 25.7 + 1.0, −0.2 | 25.3 + 0.2, −1.0 | |
| R-448A | 26 + 0.5, −2.0 | 26 + 2.0, −0.5 | 21 + 2.0, −1.0 | 20 + 0.5, −2.0 | 7 + 0.5, −2.0 |

The reconstituted thermal fluid may then be further analyzed and purified to form a reclaimed thermal fluid.

All or any portion of any of the recovered fluids may alternatively be further analyzed and purified to form a reclaimed thermal fluid of their original thermal fluid composition rather than being combined to form the consolidated thermal fluid composition.

For blends containing one or more HFOs, a stabilizer package may be added to the reconstituted thermal fluid or the reclaimed thermal fluid to stabilize the HFO in the thermal fluid.

Example 5

Two or more different used or spent thermal fluids from Table 5 are recovered, tested, and validated and then combined to form a consolidated thermal fluid composition. The consolidated thermal fluid composition includes 1,3,3,3-tetrafluoropropene (CF3CH=CHF, R-1234ze (E)), and 1,1,1,2,3,3,3-Heptafluoropropane (227ea). If the impurities are greater than 0.5%, the composition may be purified to reduce the level of impurities to less than 0.5%.

The composition of all or any portion of the consolidated thermal fluid composition is then adjusted by addition of one or more virgin or used thermal fluids to adjust to the composition to form a reconstituted thermal fluid of one of the R-515 series of thermal fluids listed in Table 5.

TABLE 5

| R-515 RECLAMATION COMPONENTS | | |
|---|---|---|
| Thermal Fluid | R-1234ze(E) (wt %) | R-227ea (wt %) |
| R-1234ze(E) | 100 | |
| R-227ea | | 100 |
| R-515A | 88 + 1.0, −2.0 | 12 + 2.0, −1.0 |
| R-515B | 91.1 + 0.1, −2.0 | 8.9 + 2.0, −0.1 |

The reconstituted thermal fluid may then be further analyzed and purified to form a reclaimed thermal fluid.

OTHER EMBODIMENTS

Embodiment 1: a process of thermal fluid reclamation comprising: combining at least two recovered thermal fluids comprising at least two refrigerant compounds to form a consolidated thermal fluid, wherein the consolidated thermal fluid is a blend of the at least two refrigerant compounds having a consolidated composition different from a recovered composition of at least one of the least two recovered thermal fluids; testing the consolidated thermal fluid and validating that the consolidated thermal fluid has greater than 95 wt %, preferably greater than 98 wt %, organic purity; adding at least one virgin thermal fluid or used thermal fluid to the consolidated thermal fluid to form a reconstituted thermal fluid; and analyzing and purifying the reconstituted thermal fluid to form a reclaimed thermal fluid, wherein the reclaimed thermal fluid has a predetermined reclaimed thermal fluid composition different from a consolidated thermal fluid composition of the consolidated thermal fluid.

Embodiment 2: the process of embodiment 1 further comprising recovering at least one spent thermal fluid as at least one of the at least two recovered thermal fluids.

Embodiment 3: the process of embodiment 1 or 2, wherein at least one of the at least two recovered thermal fluids is a single component thermal fluid.

Embodiment 4: the process of any of embodiments 1-3, wherein at least one of the at least two recovered thermal fluids is a multi-component thermal fluid blend, such as R-444A.

Embodiment 5: the process of any of embodiments 1-4, wherein the validating comprises removing one or more impurities from the consolidated thermal fluid such that the consolidated thermal fluid has greater than 95 wt %, preferably greater than 98 wt %, organic purity.

Embodiment 6: the process of embodiment 5, wherein the one or more impurities comprises an oil.

Embodiment 7: the process of any of embodiments 1-6, wherein the at least two refrigerant compounds is three refrigerant compounds.

Embodiment 8: the process of embodiment 7, wherein the three refrigerant compounds are difluoromethane, pentafluoroethane, and 1,1,1,2-tetrafluoroethane.

Embodiment 9: the process of embodiment 7 or 8, wherein the reclaimed thermal fluid is selected from the group consisting of R-407A, R-407B, R-407C, R-407D, R-407E, R-407F, and R-407H.

Embodiment 10: the process of embodiment 7, wherein the three refrigerant compounds are 1,1,1-trifluoroethane, pentafluoroethane, and 1,1,1,2-tetrafluoroethane.

Embodiment 11: the process of embodiment 7 or 10, wherein the reclaimed thermal fluid is R-404A.

Embodiment 12: the process of any of embodiments 1-6, wherein the at least two refrigerant compounds is four refrigerant compounds.

Embodiment 13: the process of embodiment 12, wherein the four refrigerant compounds are difluoromethane, pentafluoroethane, 1,1,1,2-tetrafluoroethane, and 2,3,3,3-tetrafluoropropene.

Embodiment 14: the process of embodiment 12 or 13, wherein the reclaimed thermal fluid is R-449A.

Embodiment 15: the process of any of embodiments 1-6, wherein the at least two refrigerant compounds is five refrigerant compounds.

Embodiment 16: the process of embodiment 15, wherein the five refrigerant compounds are difluoromethane, pentafluoroethane, 1,1,1,2-tetrafluoroethane, 2,3,3,3-tetrafluoropropene, and 1,3,3,3-tetrafluoropropene.

Embodiment 17: the process of embodiment 15 or 16, wherein the reclaimed thermal fluid is R-448A.

Embodiment 18: the process of embodiment 1 further comprising adding a stabilizer package to the reconstituted thermal fluid or the reclaimed thermal fluid.

Embodiment 19: a reclaimed thermal fluid formed by the process of any of embodiments 1-18.

Embodiment 20: the process of embodiment 7, wherein the three refrigerant compounds are difluoromethane, 1,1-difluoroethane and trans-1,3,3,3-tetrafluoropropene.

Embodiment 21: the process of embodiment 7 or 20, wherein the reclaimed thermal fluid is R-444A.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made, and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A process of thermal fluid reclamation comprising:
providing a plurality of recovery tanks maintaining a plurality of recovered thermal fluids;
providing at least one consolidation tank;
combining the plurality of recovered thermal fluids to form a consolidated thermal fluid in the at least one consolidation tank, wherein the consolidated thermal fluid is a blend of at least two refrigerant compounds having a consolidated composition different from a recovered composition of at least one of the plurality of recovered thermal fluids;
testing the consolidated thermal fluid and validating that the consolidated thermal fluid has greater than 95 wt % organic purity;
feeding the consolidated thermal fluid to at least one reconstitution tank;
adding at least one virgin thermal fluid or used thermal fluid to the consolidated thermal fluid in the at least one reconstitution tank to form a reconstituted thermal fluid; and
analyzing and purifying the reconstituted thermal fluid to form a reclaimed thermal fluid including at least one hydrofluoroolefin refrigerant compound, wherein the reclaimed thermal fluid has a predetermined reclaimed thermal fluid composition different from a consolidated thermal fluid composition of the consolidated thermal fluid, and
wherein the plurality of recovered thermal fluids have different percentages of the same refrigerant compounds, or
wherein a first recovered thermal fluid of the plurality of recovered thermal fluids includes a single refrigerant compound and a second recovered thermal fluid of the plurality of recovered thermal fluids comprises a blend of two refrigerant compounds, one of which is the same as the single refrigerant compound of the first recovered thermal fluid.

2. The process of claim 1 further comprising recovering at least one spent thermal fluid as at least one of the plurality of recovered thermal fluids.

3. The process of claim 1, wherein the validating comprises removing one or more impurities from the consolidated thermal fluid such that the consolidated thermal fluid has greater than 95 wt % organic purity.

4. The process of claim 3, wherein the one or more impurities comprises an oil.

5. The process of claim 1, wherein the at least two refrigerant compounds are three refrigerant compounds.

6. The process of claim 5, wherein the three refrigerant compounds are difluoromethane, pentafluoroethane, and 1,1,1,2-tetrafluoroethane.

7. The process of claim 5, wherein the reclaimed thermal fluid is selected from the group consisting of R-407A, R-407B, R-407C, R-407D, R-407E, R-407F and R-407H.

8. The process of claim 5, wherein the three refrigerant compounds are 1,1,1-trifluoroethane, pentafluoroethane, and 1,1,1,2-tetrafluoroethane.

9. The process of claim 5, wherein the reclaimed thermal fluid is R-404A.

10. The process of claim 5, wherein the three refrigerant compounds are difluoromethane, 1,1-difluoroethane and trans-1,3,3,3-tetrafluoropropene.

11. The process of claim 5, wherein the reclaimed thermal fluid is R-444A.

12. The process of claim 1, wherein the at least two refrigerant compounds are four refrigerant compounds.

13. The process of claim 12, wherein the four refrigerant compounds are difluoromethane, pentafluoroethane, 1,1,1, 2-tetrafluoroethane, and 2,3,3,3-tetrafluoropropene.

14. The process of claim 12, wherein the reclaimed thermal fluid is R-449A.

15. The process of claim 1, wherein the at least two refrigerant compounds are five refrigerant compounds.

16. The process of claim 15, wherein the five refrigerant compounds are difluoromethane, pentafluoroethane, 1,1,1, 2-tetrafluoroethane, 2,3,3,3-tetrafluoropropene, and 1,3,3,3-tetrafluoropropene (E).

17. The process of claim 15, wherein the reclaimed thermal fluid is R-448A.

18. The process of claim 1, further comprising adding a stabilizer package to the reconstituted thermal fluid or the reclaimed thermal fluid.

\* \* \* \* \*